Figure 1:
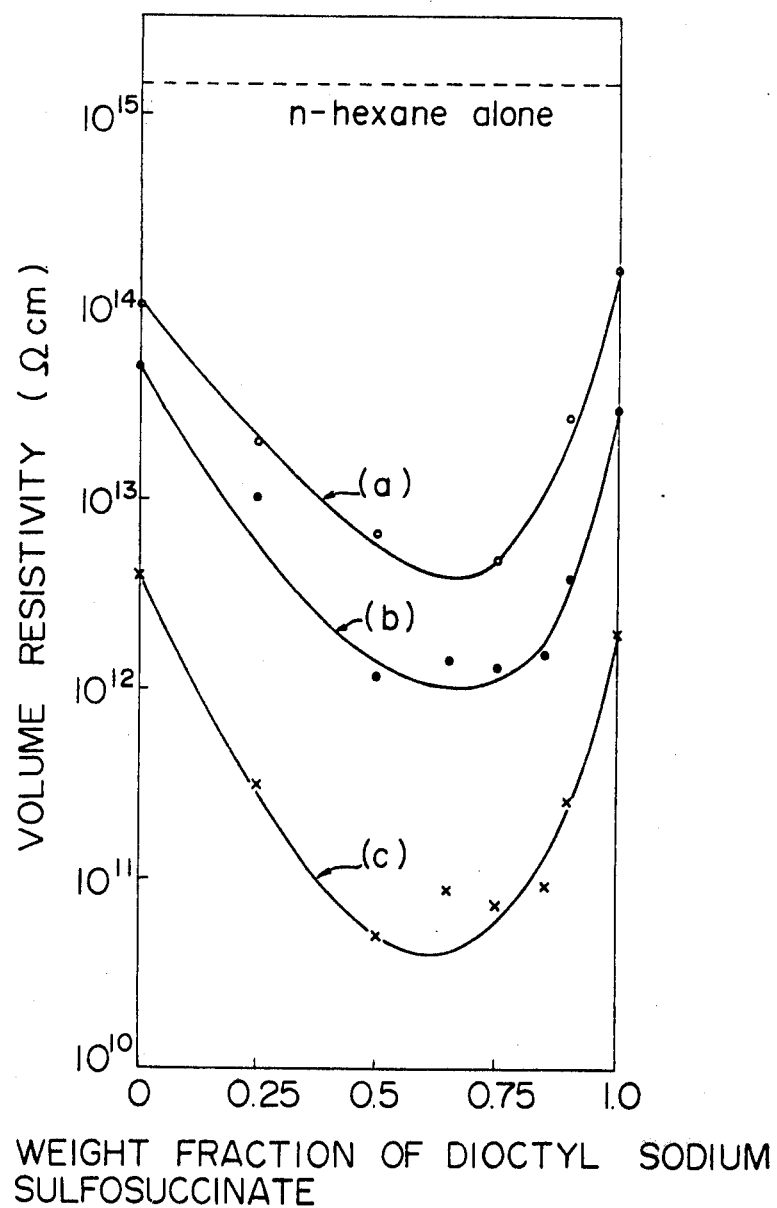

United States Patent [19]

Suzaka et al.

[11] 4,048,118

[45] Sept. 13, 1977

[54] ANTISTATIC ORGANIC LIQUID COMPOSITION

[75] Inventors: Yukinori Suzaka; Shigeru Saeda, both of Oita, Japan

[73] Assignee: Showa Denko K.K., Tokyo, Japan

[21] Appl. No.: 597,162

[22] Filed: July 18, 1975

[30] Foreign Application Priority Data

Aug. 27, 1974  Japan ................................. 49-97522

[51] Int. Cl.$^2$ ......................... H01B 1/06; C10L 1/26; C09K 3/16
[52] U.S. Cl. .............................. 252/518; 44/DIG. 2; 44/71

[58] Field of Search ................ 44/DIG. 2, 66, 71, 72; 252/518

[56] References Cited

U.S. PATENT DOCUMENTS

| | | | |
|---|---|---|---|
| 3,012,969 | 12/1961 | van der Minne et al. | 44/DIG. 2 |
| 3,206,290 | 9/1965 | McDermott et al. | 44/DIG. 2 |

Primary Examiner—Daniel E. Wyman
Assistant Examiner—Mrs. Y Harris-Smith
Attorney, Agent, or Firm—Sherman & Shalloway

[57] ABSTRACT

An antistatic organic liquid composition comprising an organic liquid having low conductivity and a mixture of an alkali metal salt of an organic acid and a nitrogen-containing salt of phytic acid is disclosed.

10 Claims, 2 Drawing Figures

ANTISTATIC ORGANIC LIQUID COMPOSITION

This invention relates to an organic liquid composition having increased electric conductivity.

Static charges are very dangerous in the handling of organic liquids having low conductivity (for example, liquid hydrocarbons). It is well known that the build-up of static charges may cause the ignition or explosion of the organic liquids and result in a serious accident. Numerous methods have been proposed to prevent accidents ascribable to the build-up of static charges by increasing the conductivity of the liquids and thereby quickening the speed at which the charge generated may be dissipated.

Cationic, anionic and nonionic compounds and amphoteric surface active agents are known to be antistatic agents for organic liquids. Many of them, however, cannot provide increased conductivity unless used in great quantities, and few are commercially feasible. Those which give relatively good results are, for example, the combination of a polyvalent metal salt of an alkylsalicyclic acid and a divalent metal salt of an organic acid and a basic nitrogen-containing polymer salt of sulfocarboxylic acid disclosed in Japanese Patent, Publication No. 1264/65; the combination of a chromium salt of a saturated aliphatic monocarboxylic acid and an alkyl phenol sulfide disclosed in U.S. Pat. No. 2,992,909; the metal salts of amphoteric surface active agents disclosed in Marumo and Ninomiya, Kogyo Kagaku Zasshi, 69, 1880, the quaternary ammonium salt of phytic acid disclosed in British Pat. No. 876,537, and the alkylated polyethyleneimine salts of phytic acid disclosed in Japanese Laid-Open Publication No. 45103/74. However, these compounds still suffer from one or more of the following defects.

1. The amount required to obtain the desired effect is still too large.
2. Their effectiveness is reduced after prolonged storage.
3. The compounds are extracted or degenerated with small amounts of water.
4. The compounds are corrosive on metals, especially iron.

Our extensive work towards to removing these defects led to the discovery of an antistatic organic liquid composition which has increased conductivity as a result the synergistic action of at least two specified compounds incorporated in very small amounts in the organic liquids having low conductivity.

According to this invention, there is provided an antistatic organic liquid composition comprising (A) an organic liquid having low conductivity, (B) a small amount of at least one alkali metal salt of an organic acid, and (C) a small amount of at least one nitrogen containing salt of phytic acid.

The invention will be described in detail hereinbelow.

Generally, liquid hydrocarbons have a volume resistivity of about $10^{15}$ to $10^{16}$ ohm.cm, which exceeds the volume resistivities of not more than $10^{13}$, preferably not more than $10^{12}$ (ohm.cm) in order to ensure the safe handling thereof. Preferably, the organic liquids having low conductivity used as component (A) in the composition of this invention are the above-mentioned liquid hydrocarbons. But organic liquids having a volume resistivity of more than $1 \times 10^{10}$ (ohm.cm) can also be used.

The "organic liquids", as used in the present application, denote organic compounds which are liquid at atmospheric pressure, or elevated pressures either alone or as mixtures. In the case of mixtures, the volume resistivity of the entire mixture is greater than $1 \times 10^{10}$ (ohm.cm), and the mixture may contain a component having a volume resistivity of $1 \times 10^{10}$ (ohm.cm) or less. So long as the mixture has a volume resistivity greater than $1 \times 10^{10}$ (ohm.cm) as a whole, it may contain small amounts of a solid substance or other additives or impurities.

The present invention is particularly effective when the organic liquid having low conductivity is a liquid hydrocarbon. Examples of such liquid hydrocarbons include aliphatic hydrocarbons such as ethane, propane, butane, pentane, hexane, heptane, octane, and the corresponding unsaturated hydrocarbons, cycloalkanes such as cyclohexane, aromatic hydrocarbons such as benzene, toluene or xylene, and alicyclic hydrocarbons such as decalin. Petroleum fractions such as kerosene or gasoline are also suitable species that can be used in this invention. The present invention can also be applied to halogenated hydrocarbons, esters, ethers, carbon disulfide, thioethers, and thioalcohols.

The alkali metal salt of an organic acid as component (B) in the composition of this invention is a salt formed between a monovalent alkali metal such as lithium, sodium, potassium, rubidium or cesium and an organic acid selected from organic carboxylic acids, organic sulfonic acids, partial alkyl esters of organic polycarboxylic acids and alkyl esters of organic sulfocarboxylic acids, said acids containing 1 to 30 carbon atoms per molecule. Preferably, the alkyl in the alkyl esters has 1 to 22 carbon atoms. Examples of preferred alkali metal those include salts formed between alkali metal such as lithium, potassium, sodium, rubidium or cesium, and satured fatty acids such as capric acid, caprylic acid, lauric acid, myristic acid, palmitic acid, stearic acid and octylic acid; unsaturated fatty acids such as oleic acid, ricinoleic acid and linoleic acid; alicyclic carboxylic acids such as naphthenic acid and cyclohexanecarboxylic acid; carboxylic acids containing an aromatic group such as benzoic acid, p-methylbenzoic acid and hydroxybenzoic acid (salicyclic acid); derivatives of these aromatic carboxylic acids which have an alkyl substituent on the benzene ring; dicarboxylic acids such as sebacic acid and phthalic acid; half esters of dicarboxylic acids such as monoesters of succinic acid, monoesters of glutaric acid, monoesters of adipic acid, monoesters of pimelic acid, monoesters of suberic acid, and monoesters of azelaic acid; saturated aliphatic sulfonic acids such as octanesulfonic acid, nonanesulfonic acid, decanesulfonic acid, undecanesulfonic acid, dodecanesulfonic acid, tridecanesulfonic acid, tetradecanesulfonic acid, pentadecanesulfonic acid, hexadecanesulfonic acid, heptadecanesulfonic acid, octadecanesulfonic acid, nonadecanesulfonic acid, and eicosanesulfonic acid; the corresponding unsaturated aliphatic sulfonic acids; aromatic sulfonic acids such as benzenesulfonic acid and naphthalenesulfonic acid; aromatic sulfonic acids containing a substituent such as alkyl (e.g., p-toluenesulfonic acid and isopropylnaphthalenesulfonic acid), or sulfocarboxylic acid esters such as sulfoacetic acid esters, sulfobenzoic acid esters, sulfosalicyclic acid esters, sulfosuccinic acid esters and sulfophthalic acid esters.

The nitrogen-containing salt of phytic acid as component (C) of the composition of this invention is prepared from an organic nitrogen compound containing basic nitrogen and phytic acid. Examples of the organic nitrogen compound are primary amines, secondary amines, tertiary amines, mixtures of these amines, quaternary ammonium compounds, and polymerization products of alkyleneimines.

The amines are expressed by the general formula $[R^1R^2R^3N]$ wherein $R^1$, $R^2$ and $R^3$ represent a hydrogen atom or an alkyl, alkenyl, aryl or cycloalkyl group containing 1 to 22 carbon atoms, and preferably at least one of groups $R^1$, $R^2$, and $R^3$ is a substituent containing at least 5 carbon atoms. Examples of these amines are amylamine, hexylamine, octylamine, dodecylamine, eicosylamine, aniline, toluidine, naphthylamine, cyclohexylamine, dihexylamine, dioctylamine, N-ethyl hexylamine, N-methyl octadecylamine, benzylmethylamine, dicyclohexylamine, N,N-dimethyl stearylamine, N,N-dioleylethylamine, N,N-dihexylvinylamine, trihexylamine, tribenzylamine, N,N-diethylaniline, and N,N-diethylcyclohexylamine.

The quaternary ammonium compounds are expressed by the general formula $[R^4R^5R^6R^7N]^+$ wherein $R^4$, $R^5$, $R^6$ and $R^7$ are selected from the group consisting of alkyl groups. alkenyl groups; aryl groups and cycloalkyl groups containing 1 to 22 carbon atoms, and preferably at least one of these substituents has at least 5 carbon atoms. Examples of these quaternary ammonium compounds are tetraamyl ammonium, tetrahexyl ammonium, tetraheptyl ammonium, tetraoctyl ammonium, lauryletrimethyl ammonium, ethyltrihexyl ammonium, cetyltrimethyl ammonium, triethylbenzyl ammonium, triethylnaphthyl ammonium, trimethylcyclohexyl ammonium, trioctylvinyl ammonium, dimethyldihexyl ammonium, diethyldioctyl ammonium, dipropyldilauryl ammonium, dimethyldioleyl ammonium, dimethyldistearyl ammonium, dimethyldicyclohexyl ammonium, and dimethylbenzylstearyl ammonium.

The polymerized products of alkyleneimines such as ethyleneimine, propyleneimine and higher homologs thereof may have a straight chain or branched-chain, or contain a substituent such as an aliphatic or aromatic group in the molecule. There is no particular limit to the degree of polymerization of these polymers, but the degree of polymerization is usually 50 to 500,000, preferably 100 to 300,000. Polyethyleneimines and polypropyleneimines in which the substituent is an aliphatic group such as hexyl, octyl, lauryl, stearyl or oleyl are especially effective for the object of this invention. Polyethyleneimine in which the aliphatic group per monomer unit of the polyethyleneimine is 0.05 to 1 is most preferable.

The "phytic acid", as used in the present application is a generic term for phytic acid itself and its derivatives resulting from the substitution of some of its 12 acidic hydrogen atoms by an alkali metal or alkaline earth metal or a transition metal such as chromium. These metals either occur spontaneously during the production of phytic acid or are added artificially.

The alkali metal salt of organic acid and the nitrogen-containing salt of phytic acid exhibit a synergistic effect when used in a weight ratio of 15:85 to 95:5, preferably 40:60 to 80:20.

The mixture of (B) and (C) can exhibit sufficient effects when used in small amounts. According to this invention, they are used in a concentration of 0.001 mg/liter to 1000 mg/liter based on the organic liquid as component (A). From the standpoint of economy, however, the concentration is preferably 0.01 mg/liter to 100 mg/liter.

Very small amounts of the mixture of (B) and (C) can reduce the volume resistivity of the organic liquids. Moreover, they are good storage stability and resistance to moisture, and do not corrode metal such as iron. Accordingly, the antistatic composition of this invention has very superior effects over the conventional compositions.

The following Examples specifically illustrate the effects of this invention on typical organic liquids.

EXAMPLE 1

140 g of a 30% aqueous solution of polyethyleneimine commercially available was reacted with 167 g of lauryl bromide to form lauryl-polyethylenemine. 20 g of the lauryl-polyethyleneimine was reacted with 6.5 g of phytic acid to form lauryl-polyethyleneimine salt. A mixture of the resulting lauryl-polyethyleneimine salt of phytic acid and dioctyl sodium sulfosuccinate in varying weight ratios was added to n-hexane. The volume resistivity of each of the resulting compositions was measured.

N-hexane was of commercially available reagent grade, and had been dehyerated for 2 days with molecular sieve 4A prior to use. The volume resistivity of the liquids was measured by means of a high resistance meter Model 4329A (a product of Yokogawa-Hewlett Packerd Co., Ltd.) and an electrode Model 2761 for liquid (a product of Yokogawa electric works, Ltd.). Since the volume resistivity of a liquid changes by the presence of water or with time, the measurement was all performed at room temperature in an atmosphere of nitrogen the dew point of which was kept at least below $-63°$ C. The volume resistivity values were measured at two minutes after the application of an electric potential of 100 V.

The results obtained are plotted in FIG. 1, in which the volume resistivities are plotted against the weight fraction of dioctyl sodium sulfosuccinate (B), with curves (a), (b) and (c) showing the case when the total amount of both lauryl-polyethyleneimine salt of phytic acid (C) and dioctyl sodium sulfosuccinate (B) was 1, 10 and 100 mg/liter, respectively.

Table 1

| Weight ratio of component (C) to component (B) | Volume resistivity (ohm · cm) | | |
|---|---|---|---|
| | (a) 1 mg/l | (b) 10 mg/l | (c) 100 mg/l |
| 100 : 0 | $1.2 \times 10^{14}$ | $4.8 \times 10^{13}$ | $4.2 \times 10^{12}$ |
| 75 : 25 | $2.0 \times 10^{13}$ | $1.0 \times 10^{13}$ | $3.2 \times 10^{11}$ |
| 50 : 50 | $6.4 \times 10^{12}$ | $1.2 \times 10^{12}$ | $5.1 \times 10^{10}$ |
| 35 : 65 | | $1.4 \times 10^{12}$ | $8.7 \times 10^{10}$ |
| 25 : 75 | $4.8 \times 10^{12}$ | $1.3 \times 10^{12}$ | $7.3 \times 10^{10}$ |
| 15 : 85 | | $1.6 \times 10^{12}$ | $9.3 \times 10^{10}$ |
| 10 : 90 | $2.8 \times 10^{13}$ | $4.5 \times 10^{12}$ | $2.8 \times 10^{11}$ |
| 0 : 100 | $1.6 \times 10^{14}$ | $3.0 \times 10^{13}$ | $1.9 \times 10^{12}$ |

Note: Volume resistivity of n-hexane is $1.4 \times 10^{15}$ ohm · cm.

It can be seen from Table 1 and FIG. 1 that the mixture of the lauryl-polyethyleneimine salt of phytic acid and the dioctyl sodium sulfosuccinate shows a surprising synergistic effect in the n-hexane solution, and that with the optimum composition, the mixture of (B) and (C) reduces the volume resistivity by a hundred fold when compared with (B) or (C) alone in the same concentration. In other words, the former requires about 1/100 of the amount needed by the latter to obtain a certain value of volume resistivity.

EXAMPLE 2

A mixture of a lauryl-polyethyleneimine salt of phytic acid and an alkali metal salt of each of various organic acids shown in Table 2 in a weight ratio of 1:1 was added to n-hexane in a concentration of 1 mg/liter, and the volume resistivity of each of the resulting compositions was measured in the same way as in Example 1. The results are shown in Table 2.

Table 2

| Run No. | Alkali metal salt of organic acid | Volume resistivity ($\times 10^{-12}$ ohm · cm) |
|---|---|---|
| 1 | Potassium palmitate | 85 |
| 2 | Sodium stearate | 81 |
| 3 | Lithium oleate | 91 |
| 4 | Potassium naphthenate | 77 |
| 5 | Dipropyl sodium salicylate | 43 |
| 6 | Sodium phthalate | 65 |
| 7 | Monooctyl sodium phthalate | 44 |
| 8 | Monooctyl sodium succinate | 42 |
| 9 | Potassium octanesulfonate | 76 |
| 10 | Sodium benzenesulfonate | 68 |
| 11 | Potassium p-toluenesulfonate | 62 |
| 12 | Sodium isopropylnaphthalene-sulfonate | 35 |
| 13 | Diamyl sodium sulfosuccinate | 9 |
| 14 | Dihexyl sodium sulfosuccinate | 12 |
| 15 | Dioctyl potassium sulfophthalate | 32 |

EXAMPLE 3

A mixture of dioctyl sodium sulfosuccinate and each of the various nitrogen-containing salts of phytic acid shown in Table 3 in a weight ratio of 1:1 was added to n-hexane in a concentration of 1 mg/liter. The volume resistivity of each of the compositions obtained was measured, and the results are shown in Table 3.

Table 3

| Run No. | Additive | Volume resistivity ($\times 10^{-12}$ ohm · cm) |
|---|---|---|
| 1 | Tetradimethyldilauryl ammonium phytate | 45 |
| 2 | Tetradimethyldistearyl ammonium phytate | 22 |
| 3 | Tridimethyldioleyl ammonium phytate | 36 |
| 4 | Stearyl polyethyleneimine salt of phytic acid | 9 |
| 5 | Laurylpolypropyleneimine salt of phytic acid | 17 |
| 6 | Laurylpolyethyleneimine salt of phytic acid partly containing chromium* | 8 |
| 7 | Laurylpolyethyleneimine salt of phytic acid partly containing sodium** | 11 |
| 8 | Tetra(stearylamine) salt of phytic acid | 41 |
| 9 | Monomethyldioleylamine salt of phytic acid | 25 |

*A salt formed between chromium phytate obtained by reacting 3 moles of phytic acid with 1 mole of chromium acetate, and laurylpolyethyleneimine.
**A salt formed between sodium phytate obtained by reacting 2 moles of phytic acid with 1 mole of sodium acetate, and laurylpolyethyleneimine.

EXAMPLE 4

A mixture of laurylpolyethyleneimine salt of phytic acid and dioctyl sodium sulfosuccinate in a weight ratio of 35:65 was added to each of various organic liquids in a concentration of 10 mg/liter. The volume resistivity of each of the resulting compositions was measured, and the results are shown in Table 4. The volume resistivities of the organic liquids themselves were also measured, and the results are shown in Table 4.

Table 4

| Run No. | Organic liquid | Volume resistivity (ohm · cm) No additive | With additive |
|---|---|---|---|
| 1 | p-Xylene | $1.9 \times 10^{16}$ | $3.7 \times 10^{11}$ |
| 2 | Carbon tetrachloride | $2.8 \times 10^{16}$ | $4.2 \times 10^{11}$ |
| 3 | Benzene | $4.6 \times 10^{15}$ | $9.2 \times 10^{10}$ |
| 4 | Cyclohexane | $8.2 \times 10^{15}$ | $3.3 \times 10^{12}$ |
| 5 | Kerosene | $2.1 \times 10^{15}$ | $1.8 \times 10^{12}$ |
| 6 | Tetralin | $6.0 \times 10^{12}$ | $8.1 \times 10^{10}$ |
| 7 | Diphenyl ether | $1.3 \times 10^{13}$ | $2.3 \times 10^{10}$ |
| 8 | Butyl acetate | $1.2 \times 10^{11}$ | $3.4 \times 10^{9}$ |
| 9 | Tetrahydrofuran | $2.0 \times 10^{10}$ | $3.5 \times 10^{8}$ |

EXAMPLE 5

Kerosene containing 2 mg/liter of the same mixture of laurylethyleneimine salt of phytic acid and dioctyl sodium sulfosuccinate as used in Example 4 was stored in an oil drum, and the stability of the volume resistivity reduction effect was examined. The results are shown in Table 5.

Table 5

| Storage period | 0 | 1 day | 1 month | 3 months | 6 months |
|---|---|---|---|---|---|
| volume resistivity (ohm · cm) | $6.4 \times 10^{12}$ | $5.4 \times 10^{12}$ | $6.7 \times 10^{12}$ | $5.9 \times 10^{12}$ | $6.2 \times 10^{12}$ |

It is clear from Table 5 that the composition of this invention exhibits stable effects even during storage for long periods of time.

EXAMPLE 6

Water (1% by volume) was added to a 2 mg/l benzene solution of the same mixture of laurylpolyethyleneimine salt of phytic acid and dioctyl sodium sulfosuccinate as used in Example 4. The resulting mixture was shaken for 3 hours by means of a reciprocating shaker (shaking cycles 100/min.; amplitude 70 mm) to bring the benzene into intimate contact with water. The mixture was allowed to stand. The upper phase (i.e. benzene solution) of the mixture was withdrawn at different time intervals and its volume resistivity measured. The benzene solution without the addition of water was also tested for volume resistivity. The results are shown in Table 6.

Table 6

| Time | 2 hours later | 5 days later | 10 days later |
|---|---|---|---|
| Water not added | $3.0 \times 10^{11}$ | $3.7 \times 10^{11}$ | $3.1 \times 10^{11}$ |
| Water added | $2.9 \times 10^{11}$ | $3.9 \times 10^{11}$ | $3.2 \times 10^{11}$ |

It can be seen from Table 6 that the volume resistivity of the composition of this invention does not change even when it is contacted with water.

EXAMPLE 7

An iron test piece (SS41) with a size of $30 \times 30 \times 3$mm was placed in a n-paraffin solution (n-paraffin with a boiling point of 170° to 190° C.) containing a mixture of laurylpolyethyleneimine salt of phytic acid and dioctyl sodium sulfosuccinate in a weight ratio of 4:6 in a concentration of 1 g/liter or 10 g/liter to perform a corrosion test. The solution was allowed to stand for about 6 weeks, and the change in the state of the test piece was observed.

The same corrosion test was performed on a commercially available antistatic agent (A) containing a chromium alkylsalicyclate as an active ingredient.

The results are shown in Table 7.

Table 7

|  | Concentration (g/l) | Occurrence of rust (evaluated visually) |
| --- | --- | --- |
| Composition of the invention | 1 | None |
|  | 10 | None |
| Antistatic agent (A) | 1 | Rust occurred in about 1/4 to 1/5 of the surface |
|  | 10 | Rust occurred in about 1/3 of the surface |

The above results show that the composition of this invention has no corrosive action, but the commercial grade antistatic agent (A) causes corrosion.

REFERENTIAL EXAMPLE

The volume resistivity of a n-hexane solution of the antistatic agent A (designated e), and a n-hexane solution of laurylpolyethyleneimine salt of phytic acid alone (designated d) was measured. The results are summarized in Table 8 and plotted in FIG. 2.

Figure 2:
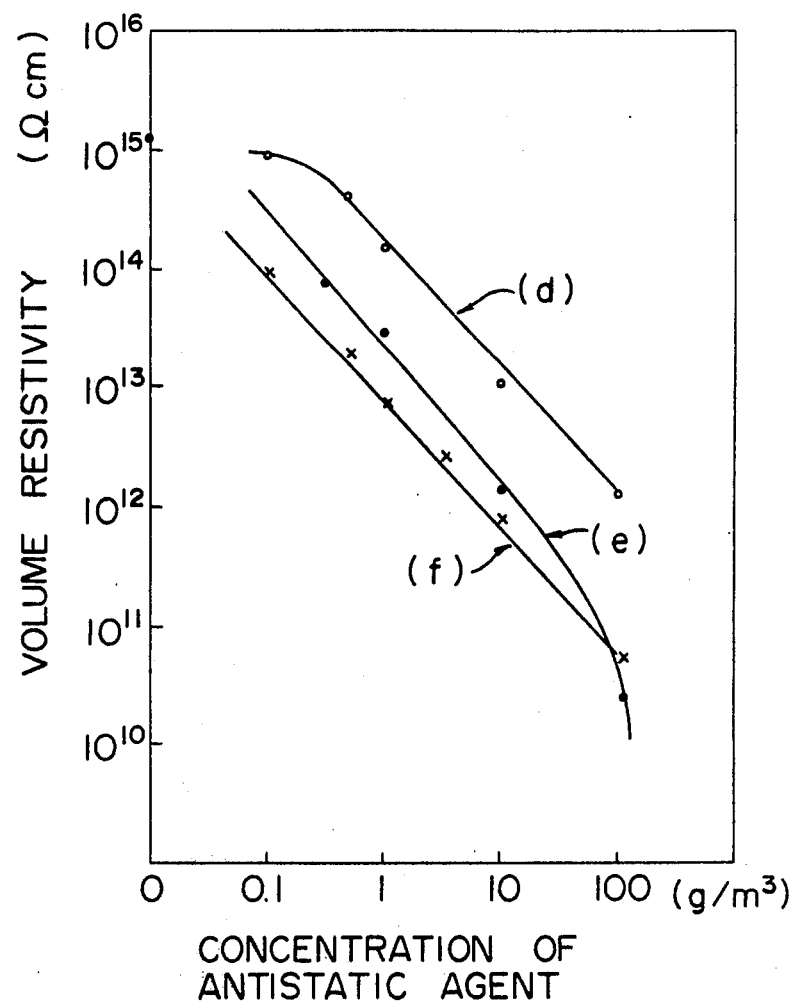

FIG. 2 also shows the volume resistivity of a n-hexane solution of dioctyl sodium sulfosuccinate and lauryl polyethyleneimine salt of phytic acid in a ratio of 50:50 (designated f).

It can be seen from FIG. 2 that the composition of this invention has very superior antistatic properties.

Table 8

| Concentration (mg/l) | Volume resistivity (ohm · cm) | | |
| --- | --- | --- | --- |
|  | Composition of this invention (f) | Commercial antistatic agent A (e) | Laurylpolyethyleneimine salt of phytic acid (d) |
| 0.1 | $9.2 \times 10^{13}$ | — | $8.0 \times 10^{14}$ |
| 0.3 | — | $7.4 \times 10^{13}$ | — |
| 1 | $6.6 \times 10^{12}$ | $2.6 \times 10^{13}$ | $1.2 \times 10^{14}$ |
| 10 | $6.8 \times 10^{11}$ | $1.2 \times 10^{12}$ | $4.8 \times 10^{13}$ |
| 100 | $4.5 \times 10^{10}$ | $2.1 \times 10^{10}$ | $4.2 \times 10^{12}$ |

What we claim is:

1. A composition with increased antistatic properties, consisting essentially of
  A. an organic liquid of low conductivity having a volume resistivity greater than $1 \times 10^{10}$ ohm.cm,
  B. at least one alkali metal salt of an organic acid selected from the group consisting of organic carboxylic acids, organic sulfonic acids, partial alkyl esters or organic polycarboxylic acids and alkyl esters of organic sulfocarboxylic acids, the acids containing 1 to 30 carbon atoms per molecule, and the alkyl group in the alkyl esters having 1 to 22 carbon atoms, and
  C. a polyalkyleneimine salt of phytic acid, the salt being selected from the group consisting of unsubstituted and substituted salts, the substituent being selected from the group consisting of hexyl, octyl, lauryl, stearyl, and oleyl radicals, the total amount of components (B) and (C) being 0.001 to 1000 mg per liter of component (A).

2. The composition of claim 1 wherein the total amount of components (B) and (C) is 0.01 to 100 mg per liter of component (A).

3. The composition of claim 1 wherein the weight ratio of component (B) to component (C) is 15:85 to 95:5.

4. The composition of claim 3 wherein the weight ratio of component (B) to component (C) is 40:60 to 80:20.

5. The composition of claim 1 wherein the polyalkylenimine salt of component (C) is a polyethylenimine having 0.05 to 1 aliphatic group per monomer unit of the polyethylenimine.

6. The composition of claim 1 wherein component (B) is a sodium salt of a dialkyl ester of sulfosuccinic acid, each of the alkyl groups in the dialkyl ester having 1 to 22 carbon atoms.

7. The composition of claim 1 wherein component (A) is a liquid hydrocarbon having a volume resistivity of larger than $1 \times 10^{15}$ ohm.cm.

8. The composition of claim 1, wherein the polyalkyleneimine salt of component (C) has a degree of polymerization of from 50 to 500,000.

9. The composition of claim 8, wherein the degree of polymerization is from 100 to 300,000.

10. The composition of claim 1, wherein component (B) is selected from the group consisting of potassium palmitate, sodium stearate, lithium oleate, potassium naphthenate, dipropyl sodium salicylate, sodium phthalate, monooctyl sodium phthalate, monooctyl sodium succinate, potassium octanesulfonate, sodium benzenesulfonate, potassium p-toluenesulfonate, sodium isopropylnaphthalenesulfonate, diamyl sodium sulfosuccinate, dihexyl sodium sulfosuccinate, dioctyl potassium sulfophthalate; and component (C) is selected from the group consisting of lauryl polyethyleneimine, stearyl polyethyleneimine, and lauryl polypropyleneimine salts of phytic acid.

* * * * *